(12) United States Patent
Baiz Matuk

(10) Patent No.: US 8,577,725 B2
(45) Date of Patent: Nov. 5, 2013

(54) TELECOMMUNICATION AND ADVERTISING BUSINESS MODEL AND METHOD OF UTILIZING SAME

(75) Inventor: Enrique A. Baiz Matuk, Sunny Isles, FL (US)

(73) Assignee: Papatel, Inc., Sunny Isles Beach, FL (US)

( * ) Notice: Subject to any disclaimer, the term of this patent is extended or adjusted under 35 U.S.C. 154(b) by 31 days.

(21) Appl. No.: 13/061,548

(22) PCT Filed: Sep. 2, 2008

(86) PCT No.: PCT/US2008/075015
§ 371 (c)(1),
(2), (4) Date: Mar. 1, 2011

(87) PCT Pub. No.: WO2010/027352
PCT Pub. Date: Mar. 11, 2010

(65) Prior Publication Data
US 2011/0191189 A1    Aug. 4, 2011

(51) Int. Cl.
*G06Q 30/00* (2012.01)
*H04M 11/04* (2006.01)
*H04M 1/64* (2006.01)

(52) U.S. Cl.
USPC .......... 705/14.66; 706/14.19; 379/51; 379/76

(58) Field of Classification Search
USPC ................ 705/14.49; 379/114.13, 142.05
See application file for complete search history.

(56) References Cited

U.S. PATENT DOCUMENTS

| | | | | |
|---|---|---|---|---|
| 3,784,721 A | * | 1/1974 | Kilby | 379/74 |
| 4,130,801 A | * | 12/1978 | Prygoff | 455/3.02 |
| 5,396,542 A | * | 3/1995 | Alger et al. | 379/67.1 |
| 5,481,611 A | * | 1/1996 | Owens et al. | 713/159 |
| 5,845,205 A | * | 12/1998 | Alanara et al. | 455/564 |
| 5,883,964 A | * | 3/1999 | Alleman | 379/205.01 |
| 6,009,150 A | | 12/1999 | Kamel | |
| 6,301,342 B1 | | 10/2001 | Ander et al. | |
| 6,590,970 B1 | | 7/2003 | Cai et al. | |
| 6,683,941 B2 | * | 1/2004 | Brown et al. | 379/88.22 |
| 6,856,673 B1 | * | 2/2005 | Banks et al. | 379/114.13 |
| 6,889,054 B2 | | 5/2005 | Himmel et al. | |
| 6,947,531 B1 | | 9/2005 | Lewis et al. | |
| 6,993,497 B2 | * | 1/2006 | Yeh et al. | 705/14.66 |
| 7,440,563 B2 | * | 10/2008 | Baiz Matuk | 379/209.01 |
| 2001/0012344 A1 | | 8/2001 | Kwon | |
| 2003/0050837 A1 | | 3/2003 | Kim | |
| 2003/0182558 A1 | * | 9/2003 | Lazzaro et al. | 713/183 |
| 2004/0091093 A1 | | 5/2004 | Bookstaff | |
| 2005/0086104 A1 | | 4/2005 | McFadden | |

(Continued)

OTHER PUBLICATIONS

Chetham, "Endure an Ad, Make a Free Call", Wireless Week, vol. 5, No. 46, Nov. 15, 1999, p. 28.*

(Continued)

*Primary Examiner* — John G Weiss
*Assistant Examiner* — Scott C Anderson
(74) *Attorney, Agent, or Firm* — Hunton & Williams LLP

(57) ABSTRACT

A telecommunication and advertising business model and method of utilizing same (10) that permits users to make telephone calls for a predetermined amount of time according to the destination of the call. The telecommunication and advertising business model is controlled by an on-line database system and comprises customers, and companies that pay for advertising through a system.

16 Claims, 2 Drawing Sheets

(56) References Cited

U.S. PATENT DOCUMENTS

| | | |
|---|---|---|
| 2005/0149385 A1 | 7/2005 | Trively |
| 2006/0067494 A1* | 3/2006 | Slagle et al. ............. 379/114.01 |
| 2006/0206381 A1* | 9/2006 | Frayman ........................ 705/14 |
| 2007/0026852 A1 | 2/2007 | Logan et al. |
| 2007/0055565 A1 | 3/2007 | Baur et al. |
| 2007/0061198 A1* | 3/2007 | Ramer et al. ................... 705/14 |
| 2007/0226805 A1* | 9/2007 | Jeal et al. ....................... 726/27 |
| 2009/0265214 A1 | 10/2009 | Jobs et al. |

OTHER PUBLICATIONS

Randall Stross, Apple Wouldn't Risk Its Cool Over a Gimmick, Would It?, *The New York Times*, Digital Domain, http:/www.nytimes.com/2009/11/15/business/15digi.html, Nov. 15, 2009, pp. 1-3.

International Search Report from PCT/US2008/075015; Sumo Technologies, LLC.

* cited by examiner

TELECOMMUNICATION AND ADVERTISING BUSINESS MODEL AND METHOD OF UTILIZING SAME

CROSS-REFERENCE TO RELATED APPLICATIONS

This application is the U.S. National Stage filing of International Application No. PCT/US2008/075015, filed Sep. 2, 2008, the disclosure of which is hereby incorporated by reference.

FIELD OF THE INVENTION

The present invention relates to business models, and more particularly, to telecommunication and advertising business models and methods that permit users to subscribe to a service that allows them to receive telecommunication services in return for receiving commercial messages.

DESCRIPTION OF THE RELATED ART

Many telecommunication business models have been developed in the past. None of them, however, include a system that enables the calling party, and the called party or conferenced parties, to receive the same or different advertisements or commercial messages simultaneously, in consideration for free telecommunication services. In addition, no prior telecommunication business models include a system where advertisers, from different countries, have access to an internet based system that allows them to submit commercial messages online and in real time that will be played for the caller and/or the called party and/or parties, depending on their interests.

Applicant believes that one of the closest references corresponds to U.S. Pat. No. 6,009,150, issued to Kamel on Dec. 28, 1999 for a call processing method for delivering promotional messages. Another reference corresponds to U.S. Pat. No. 6,947,531, issued to Lewis, et al. on Sep. 20, 2005 for a system and method for advertising supported communications. Another reference corresponds to U.S. Pat. No. 6,590,970, issued to Cai, et al. on Jul. 8, 2003 for Intelligent-networked telephone system having advertisement with bonus free phone call service. Another reference corresponds to U.S. Patent Application Publication No. 20050086104, published on Apr. 21, 2005 for Jeffrey A. McFadden and titled Delivery of advertising to telephone users. Another reference corresponds to U.S. Pat. No. 6,889,054, issued to Himmel, et al. on May 3, 2005 for a method and system for schedule based advertising on a mobile phone. Another reference corresponds to U.S. Pat. No. 6,301,342 issued to Ander, et al. on Oct. 9, 2001 for Method relating to telephone communications including the transmission of advertising messages. Another reference corresponds to U.S. Patent Application Publication No. 20050149385, published on Jul. 7, 2005 for Martin Churchill Trively and titled a system and method for receiving and responding to promotional offers using a mobile phone. Another reference corresponds to U.S. Patent Application Publication No. 20040091093, published on May 13, 2004 for Blake Bookstaff titled a method and system for providing advertising to telephone callers. Another reference corresponds to U.S. Patent Application Publication No. 20030050837, published on Mar. 13, 2003 for Do Sik Kim titled Method and system providing advertisement using tone of ringing sounds of mobile phone and commercial transaction service in association with the same. Another reference corresponds to U.S. Patent Application Publication No. 20010012344, published on Aug. 9, 2001 for Hwang-Sub Kwon titled an advertising method and system for providing advertisement and telephone-call service. Another reference corresponds to U.S. Pat. No. 6,856,673, issued to Banks, et al. on Feb. 15, 2005 for Targeted advertising in a telephone dialing system. Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a telecommunication and advertising business model and method of utilizing same that permits users to subscribe to a service that allows them to make use of telecommunication services with other users in exchange for all of them receiving advertisements and/or commercial messages, and wherein worldwide companies and/or advertisers advertise to all users through a system.

It is another object of this invention to provide a telecommunication and advertising business model and method of utilizing same that permits users to make free unlimited telephone calls with interruptions that will occur at predetermined times for commercial messages, which depend on the advertiser, destination, whether the user or users is/are member(s) of the system, and other factors.

It is another object of this invention to provide a telecommunication and advertising business model and method of utilizing same that provides companies and/or advertisers with a system that will allow them to access their advertisements and/or commercial messages via an Internet browser.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
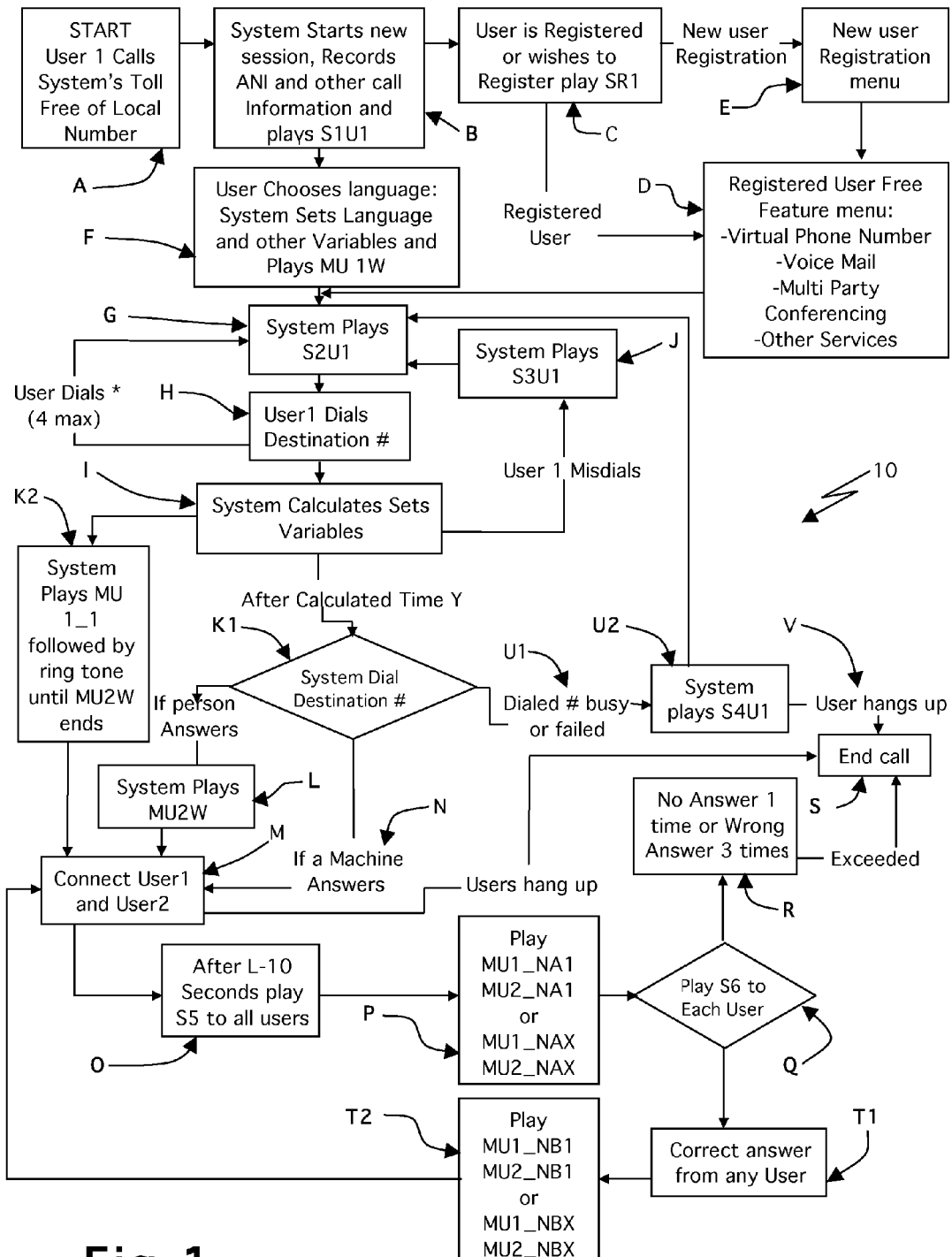
FIG. 1 shows a schematic overview of key components and the flow of information between the key components of the present invention, defined as a telecommunication and advertising business model and method of utilizing same.

Referring now to the drawings, the telecommunication and advertising business model of the present invention is generally referred to with numeral 10.

As seen in FIG. 1, the telecommunication and advertising business model 10 permits users to make telephone calls. During those telephone calls, interruptions will occur at predetermined times for commercial messages. Predetermined factors determine the commercial messages used, including but not limited to, demographics of a user, destination, advertising, and membership. It is noted that users comprise a calling party, a party that initiates a telecommunication call, defined as user 1; a called party, a party that receives the initiated telecommunication call from the calling party, defined as user 2, and several other parties, each being a different user when there is a teleconference. The present invention permits users to subscribe to a service that allows them to receive telecommunication services. Such telecommunication services include, but are not limited to, international and national long distance communications, voice mail, and conferencing, in return for all parties receiving advertisements and/or commercial messages. A calling party and the called parties will receive advertisements and/or commercial messages that may be identical and/or different, and simultaneous. The system also allows temporary guests who have not yet subscribed to the service to make use of them. The system is intelligent and based on a caller ID (Automatic Number Identification, ANI), a destination number (Dialed Number Information Services, DNIS), the time of day, and other factors that will decide what advertisements and/or commercial messages are most suitable to play. Advertisers that can be on different sides of the communication fund the system. The system also requests users to dial a digit or a DTMF (Dual Tone Multi Frequency) during all or some advertising messages in order to continue with the call. This provides proof to the advertisers that the users listened to the advertising messages.

Figure 2:
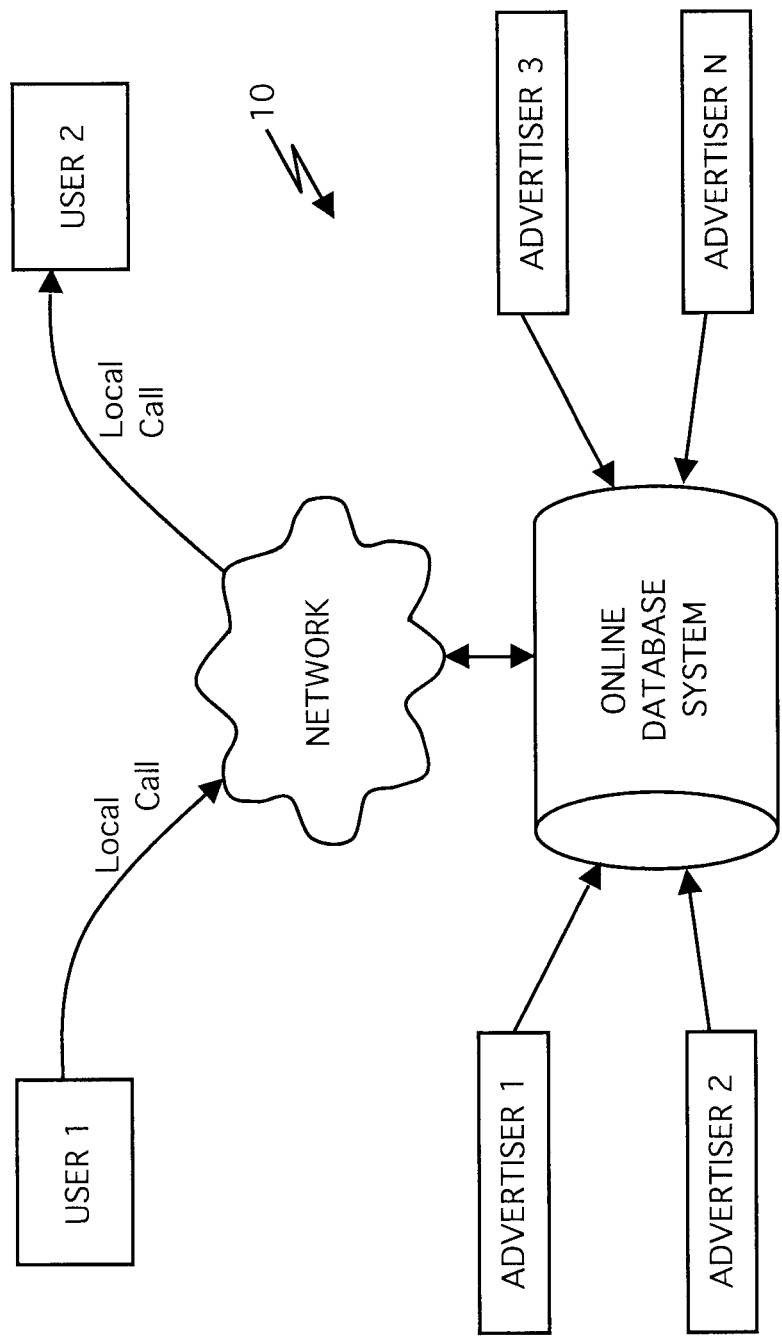
FIG. 2 is a schematic diagram that provides further detail regarding relationships and flow of information between the key components shown in FIG. 1.

As further illustrated in FIG. 1, and as seen in FIG. 2, the method for utilizing a telecommunication and advertising business model comprises a subscription-based membership for free predetermined telecommunication and advertising services for users that are funded by advertisers and/or companies. The method for utilizing a telecommunication and advertising business model, having a system, plays free simultaneously identical or different commercial advertisements/messages to at least two users. Advertisers and/or companies fund the free simultaneously identical or different commercial advertisements/messages. In the preferred embodiment of the method, the free simultaneously identical or different commercial advertisements/messages comprise at least a first portion and a second portion. An identical or different random DTMF number request is made to the at least two users after the first portion and before the second portion. The second portion plays only when the identical or different random DTMF number request is properly responded to by the at least two users. The identical or different random DTMF number request is made to the at least two users, to ensure that they are listening to the free simultaneously identical or different commercial advertisements/messages.

A list of acronyms is defined in Chart 1 below for FIG. 1 that shows a schematic overview of key components and the flow of information between the key components of the present invention:

CHART 1

| Acronym | Definition |
|---|---|
| S1U1 | 1 for English, 2 for Spanish, 3 Other Languages 4 if Registered User or to Register |
| SR1 | 1 Registered 2 New Registration |
| MU1W | Welcome Advertising Message to Originating User 1 |
| MUXW | Welcome Advertising Message to User X |
| S2U1 | Dial destination number DTMF Request, if mistake please press STAR* |
| S3U1 | The dialed number was wrong |
| MU1_1, MU1_X | Advertising Messages |
| S4U1 | The number you dialed is busy/no connection available, dial again or try again later |

CHART 1-continued

| Acronym | Definition |
|---|---|
| S5 | Warning Tone |
| MU1_NA1 MU2_NA1 | (advertiser) brings you the next portion of your call |
| S6 | random DTMF request. And Repeat twice if incorrect once if no answer |
| MU1_NB1, MU2_NB1 . . . | 2nd part of MUX_NA1 |

A glossary of terms is defined in Chart 2 for Chart 1 as follows:

CHART 2

| | |
|---|---|
| Y | Function of (advertisement, average time to ring tone, average answering time, other variables |
| L | Allowed call time segment per destination per ad |
| S | System Message |
| U1 | User 1, Originating User |
| M | Ad Message |
| W | Welcome message |
| X | Integer |

As best seen in FIG. 2, the telecommunication business model 10 comprises advertisers that are defined as companies or advertising agencies that pay a fee for advertising commercial messages through the telecommunication business model 10. The advertisers submit their respective commercial messages to an on-line database system, and the on-line database system in turn publishes them over a network to the calling and called parties. Companies or advertisers advertise their products and services, and have access to a unique Internet based worldwide accessible system to allow them to manage their advertisements and/or commercial messages online. The free simultaneously identical or different commercial advertisements/messages are provided through the on-line database system, and in the preferred embodiment, are managed through the network by the advertisers and/or companies. Such a network may be the world-wide-web or Internet.

In one application of the method, the telecommunication and advertising business model, comprises the steps of:

Step A: calling a system, toll or local telephone number, by a user 1;

Step B: starting a new session by said system, said system recording an ANI and requesting from said user 1 a preferred language, and allowing said user 1 to enter as a member or register, said system proceeding to Step C if said user 1 is registered or wishes to register in said system and said system proceeding to Step F otherwise;

Step C: playing a first message to said user 1, said system proceeding to Step D if said user 1 is registered in said system and said system proceeding to Step E otherwise;

Step D: reaching a subscription-based membership user free-feature menu, comprising a virtual phone number, voicemail, and multi-party conferencing, said system proceeding to Step G if said user 1 said is registered in said system;

Step E: reaching a registration menu to register, if said user 1 wishes to register and said system proceeding to Step D;

Step F: choosing a language by said user 1, said system setting language based on a selection by said user 1 and playing a second message to said user 1;

Step G: playing dial destination number DTMF request by said system and said user 1 pressing a key if a mistake is made;

Step H: dialing a destination telephone number by said user 1;

Step I: calculating cost per minute, ad duration, call segment duration time "L", ad frequency, and delay time "Y" to start dialing, and determining which commercial advertisements/messages to play based on demographics of said user 1, said system proceeding to Step J if said user 1 misdials and said system proceeding to Step K1 and K2 otherwise;

Step J: playing a third message to said user 1 by said system if said user 1 misdials, said system proceeding to Step G;

Step K1: waiting for said delay time "Y" and dialing said destination telephone number by said system, said system proceeding to Step L if said user 2 is available to receive answer a telephone call, said system proceeding to Step N if said telephone call is to be answered by an automated telephone answering service, and said system proceeding to Step U1 otherwise;

Step K2: playing a fourth message to said user 1 followed by a ring tone by said system until said system completes playing a fifth message in Step L to a user 2, said system proceeding to Step M;

Step L: answering said telephone call by said user 2 and playing said fifth message to said user 2 by said system;

Step M: connecting said user 1 to said user 2 by said system, said system proceeding to Step O;

Step N: answering said telephone call by an automated telephone answering service and said system proceeding to Step M;

Step O: calculating said call segment duration time "L" minus a first predetermined time period and playing a sixth message to said users 1 and 2 indicating that said telephone call will be interrupted at end of said first predetermined time period;

Step P: playing simultaneously a first portion of identical or different first messages to said users 1 and 2;

Step Q: asking simultaneously said users 1 and 2 for an identical or different random DTMF number request, said system proceeding to Step R if said random DTMF number request is incorrectly answered or is not answered at all by said users 1 and 2 within said first predetermined number of times, said system proceeding to Step T1 otherwise;

Step R: repeating said random DTMF number request a first predetermined number of times if incorrect or if no answer, to said users 1 and 2;

Step S: terminating said telephone call;

Step T1: answering said random DTMF number request correctly within said first predetermined number of times by said users 1 and 2;

Step T2: playing simultaneous remainder of said identical or different first messages to said users 1 and 2 and going to Step M;

Step U1: attempting said destination telephone number if busy or fails;

Step U2: playing a seventh message to said user 1 that said destination number is busy or has failed, said system proceeding to Step G to retry said destination number, and said system proceeding to Step V otherwise; and Step V: terminating said telephone call at any time if either of said users 1 or 2 disconnects.

In step A) of the method, calling a system, toll or local telephone number, by a user 1; the user 1 may incur a local telephone calling expense. In step B) of the method, starting a new session by said system, said system recording an ANI and requesting from said user 1 a preferred language, and allowing said user 1 to enter as a member or register, said system proceeding to Step C if said user 1 is registered or wishes to register in said system and said system proceeding to Step F otherwise; the ANI defines an automatic number identification. In step C) of the method, playing a first message to said user 1, said system proceeding to Step D if said user 1 is registered in said system and said system proceeding to Step E otherwise; the first message may comprise playing "number 1 if registered, or number 2 for new registration" depending on whether the user 1 is registered in said system or wishes to register. In step D) of the method, reaching a subscription-based membership user free-feature menu, comprising a virtual phone number, voicemail, and multi-party conferencing, said system proceeding to Step G if said user 1 said is registered in said system; the system provides these services at no cost to the user 1. In step E) of the method, reaching a registration menu to register, if said user 1 wishes to register and said system proceeding to Step D; only registered users may access said menu. In step F) of the method, choosing a language by said user 1, said system setting language based on a selection by said user 1 and playing a second message to said user 1; the second message may comprise playing a welcome advertisement message to said user 1. In step G) of the method, playing dial destination number DTMF request by said system and said user 1 pressing a key if a mistake is made; the key may be the telephone's star key as an example. DTMF defines a dual tone multi frequency. In step H) of the method, dialing a destination telephone number by said user 1; the user 1 dials the desired destination telephone number. In step I) of the method, calculating cost per minute, ad duration, call segment duration time "L", ad frequency, and delay time "Y" to start dialing, and determining which commercial advertisements/messages to play based on demographics of said user 1, said system proceeding to Step J if said user 1 misdials and said system proceeding to Step K1 and K2 otherwise; the system comprises data from advertisers calculating the above-referenced. In step J) of the method, playing a third message to said user 1 by said system if said user 1 misdials, said system proceeding to Step G; the third message may comprise playing "the dialed number was wrong" by the system. In step K1) of the method, waiting for said delay time "Y" and dialing said destination telephone number by said system, said system proceeding to Step L if said user 2 is available to receive answer a telephone call, said system proceeding to Step N if said telephone call is to be answered by an automated telephone answering service, and said system proceeding to Step U1 otherwise; the system minimizes this time. In step K2) of the method, playing a fourth message to said user 1 followed by a ring tone by said system until said system completes playing a fifth message in Step L to a user 2, said system proceeding to Step M; the fourth message may comprise playing "this telephone call is bought to you by "a particular company or brand name"". The fifth message may comprise playing "this telephone call is bought to you by "a particular company or brand name"". In step L) of the method, answering said telephone call by said user 2 and playing said fifth message to said user 2 by said system; the user 2 hears the fifth message upon receiving the telephone call. In step M) of the method, connecting said user 1 to said user 2 by said system, said system proceeding to Step O; the system makes the connection. In step N) of the method, answering said telephone call by an automated telephone answering service and said system proceeding to Step M; this step occurs when user 2 is not available. In step O) of the method, calculating said call segment duration time "L" minus a first predetermined time period and playing a sixth message to said users 1 and 2 indicating that said telephone call will be interrupted at end of said first predetermined time period; the first predetermined time period may be 10 seconds and the sixth message may comprise playing "your telephone call will be interrupted in 10 seconds". In step P) of the method, playing simultaneously a first portion of identical or different first messages to said users 1 and 2; the system can play messages in different languages too, and if it's a multi-party conference, the identical or different first messages are played to all users or parties. In step Q) of the method, asking simultaneously said users 1 and 2 for an identical or different random DTMF number request, said system proceeding to Step R if said random DTMF number request is incorrectly answered or is not answered at all by said users 1 and 2 within said first predetermined number of times, said system proceeding to Step T1 otherwise; requesting the users to select a specific DTMF number ensures that all the users are actually listening to the advertising messages. In step R) of the method, repeating said random DTMF number request a first predetermined number of times if incorrect or if no answer, to said users 1 and 2; as stated above, requesting the users to select a specific DTMF number ensures that all the users are actually listening to the advertising messages. In step S) of the method, terminating said telephone call; the system simply ends the telephone call. In step T1) of the method, answering said random DTMF number request correctly within said first predetermined number of times by said users 1 and 2; the first predetermined times may be three as an example. In step T2) of the method, playing simultaneous remainder of said identical or different first messages to said users 1 and 2 and going to Step M; the remainder of the first messages is played. In step U1) of the method, attempting said destination telephone number if busy or fails; the system tries to connect the destination telephone number. In step U2) of the method, playing a seventh message to said user 1 that said destination number is busy or has failed, said system proceeding to Step G to retry said destination number, and said system proceeding to Step V otherwise; the system notifies the user 1 that the destination number is busy or has failed. In step V) of the method, terminating said telephone call at any time if either of said users 1 or 2 disconnects; the system prepares for a new session.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

INDUSTRIAL APPLICABILITY

It is evident that an invention such as the a telecommunication and advertising business model and method of utilizing same claimed in the present application is quite desirable because it permits users to subscribe to a service that allows them to make use of telecommunication services with other users in exchange for all of them receiving advertisements and/or commercial messages and to make free unlimited telephone calls with interruptions that will occur at predetermined times for commercial messages, which depend on the advertiser, destination, whether the user or users is/are member(s) of the system, and other factors. The present invention is also quite desirable because it allows worldwide companies and/or advertisers advertise to all users through a system and access their advertisements and/or commercial messages via an Internet browser.

What is claimed is:

1. A method of providing free telecommunication services to users, wherein the method is carried out with a computer system comprising a database for storing advertisements, the method comprising:

receiving at least one advertisement from at least one advertiser;

storing the at least one advertisement in the database;

establishing a telephone call over a network between a first user and a second user wherein the establishment of the telephone call comprises providing free telecommunications services;

playing, by a computer processor, the at least one advertisement via the network to the first user and the second user;

generating, by the computer processor, a variable keystroke request that is randomly generated, sending, by the computer processor, at least one variable keystroke request over the network to the first user and the second user, wherein the variable keystroke request has a value corresponding to a key on a telephone keypad;

receiving, by the computer processor, a response to the at least one variable keystroke request;

determining, by the computer processor, whether the response matches the at least one variable keystroke request;

if the response matches the at least one variable keystroke request, continuing to provide the free telecommunication services; and if the response is not received or does not match the at least one variable keystroke request, terminating the free telecommunication services.

2. The method of claim 1, wherein the at least one variable keystroke request is generated by the computer system such that the variable keystroke request changes its value for subsequent requests.

3. The method of claim 1, wherein the step of playing the at least one advertisement via the network to the first user and the second user comprises playing a first advertisement to the first user and a second advertisement to the second user, wherein the first advertisement is different from the second advertisement.

4. The method of claim 1, wherein the at least one variable keystroke request comprises a first variable keystroke request sent to the first user, and a second variable keystroke request sent to the second user, and the first variable keystroke request is different from the second variable keystroke request.

5. The method of claim 1, wherein the at least one variable keystroke request comprises a first variable keystroke request sent to the first user, and a second variable keystroke request sent to the second user, and the first variable keystroke request is the same as the second variable keystroke request.

6. The method of claim 1, wherein the at least one advertisement comprises a first portion and a second portion and the step of playing the at least one advertisement comprises:

playing the first portion of the at least one advertisement before sending the variable keystroke request; and playing the second portion of the at least one advertisement after the step of determining whether the response matches the variable keystroke request.

7. The method of claim 1, wherein the step of playing the at least one advertisement is carried out after the step of establishing the telephone call over the network between the first user and the second user.

8. The method of claim 1, wherein the response comprises an input from each of the first and the second users and the step of continuing to provide the free telecommunication services is carried out only if the response from the first party matches the variable keystroke request sent to the first party and the response from the second party matches the variable keystroke request sent to the second party.

9. The method of claim 1, further comprising
receiving a plurality of advertisements;
storing the plurality of advertisements in the database; and
selecting one of the plurality of advertisements to play to one of the first user and the second user based upon one or more identified demographics of one of the first user and the second user.

10. An advertising system comprising:
a database for storing advertisements;
a processor; and
a network;
wherein the processor is programmed to:
  receive a call request from a first user over the network, wherein the call request identifies a telephone number of a second user;
  connect a call between the first user and the second user using the network;
  interrupt the call between the first user and the second user;
  play at least one advertisement stored in the database to at least one of the first user and the second user following the interrupt;
  generate a variable keystroke request for at least one of the first user and the second user wherein the variable keystroke request is randomly generated;
  send the variable keystroke request over the network to at least one of the first user and the second user, wherein the variable keystroke request asks the at least one of the first user and the second user to activate a key corresponding to the variable keystroke request;
  receive a response to the variable keystroke request over the network from the at least one of the first user and the second user;
  if the response is correct, allow the call between the first user and the second user to continue; and
  if the response is incorrect or not received, terminate the call between the first user and the second user.

11. The system of claim 10, wherein the variable keystroke request has a value corresponding to a key on a telephone keypad and the variable keystroke request is generated by the system such that the variable keystroke request changes its value for subsequent requests.

12. The system of claim 10, wherein the at least one of the first user and the second user generates the response by activating a key on the telephone keypad to generate a dual-tone multi-frequency response.

13. The system of claim 10, wherein the at least one advertisement comprises a first advertisement that is played to the first user and a second advertisement that is played to to the second user, and wherein the first advertisement is different from the second advertisement.

14. The system of claim 10, wherein the at least one advertisement comprises a first advertisement that is played to the first user and that is played a second advertisement to the second user, and wherein the first advertisement is the same as the second advertisement.

15. The system of claim 10, wherein the at least one advertisement comprises a first portion and a second portion and the processor is programmed to:
  play the first portion of the at least one advertisement before sending the variable keystroke request; and
  play the second portion of the at least one advertisement after the step of determining whether the response matches the variable keystroke request.

16. The system of claim 10, wherein the processor is programmed to carry out the step of playing the at least one advertisement after the step of establishing a telephone call over the network between the first user and the second user.

* * * * *

UNITED STATES PATENT AND TRADEMARK OFFICE
CERTIFICATE OF CORRECTION

PATENT NO.       : 8,577,725 B2  
APPLICATION NO. : 13/061548  
DATED            : November 5, 2013  
INVENTOR(S)      : Enrique A. Baiz Matuk Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 86 days.

Signed and Sealed this
Twenty-second Day of September, 2015

Michelle K. Lee
*Director of the United States Patent and Trademark Office*